(12) United States Patent
Budagavi

(10) Patent No.: US 11,197,024 B2
(45) Date of Patent: Dec. 7, 2021

(54) LUMA-BASED CHROMA INTRA-PREDICTION FOR VIDEO CODING

(71) Applicant: Texas Instruments Incorporated, Dallas, TX (US)

(72) Inventor: Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/898,875

(22) Filed: Jun. 11, 2020

(65) Prior Publication Data

US 2020/0304833 A1 Sep. 24, 2020

Related U.S. Application Data

(63) Continuation of application No. 16/434,773, filed on Jun. 7, 2019, now Pat. No. 10,715,830, which is a (Continued)

(51) Int. Cl.
*H04N 19/107* (2014.01)
*H04N 19/117* (2014.01)
(Continued)

(52) U.S. Cl.
CPC ......... *H04N 19/593* (2014.11); *H04N 19/107* (2014.11); *H04N 19/11* (2014.11);
(Continued)

(58) Field of Classification Search
CPC .......... H04N 19/00024; H04N 19/0089; G06T 9/004
See application file for complete search history.

(56) References Cited

U.S. PATENT DOCUMENTS

2011/0255591 A1 10/2011 Kim et al.
2012/0189051 A1* 7/2012 Zheng ................... H04N 19/86
375/240.12
(Continued)

OTHER PUBLICATIONS

"TMS320DM6467 Digital Media System-on-Chip", SPRS403G, Texas Instruments Incorporated, Dec. 2007, revised Oct. 2010, pp. 1-355.
(Continued)

*Primary Examiner* — Obafemi O Sosanya
(74) *Attorney, Agent, or Firm* — Charles F. Koch; Charles A. Brill; Frank D. Cimino

(57) ABSTRACT

A method for luma-based chroma intra-prediction in a video encoder or a video decoder is provided that includes filtering reconstructed neighboring samples of a reconstructed down sampled luma block, computing parameters $\alpha$ and $\beta$ of a linear model using the filtered, reconstructed neighboring samples of the reconstructed down sampled luma block and reconstructed neighboring samples of a corresponding chroma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the reconstructed down sampled luma block, and computing samples of a predicted chroma block from corresponding samples of the reconstructed down sampled luma block using the linear model and the parameters.

16 Claims, 7 Drawing Sheets

Related U.S. Application Data continuation of application No. 15/664,783, filed on Jul. 31, 2017, now Pat. No. 10,368,094, which is a continuation of application No. 15/069,653, filed on Mar. 14, 2016, now Pat. No. 9,723,327, which is a continuation of application No. 13/470,186, filed on May 11, 2012, now Pat. No. 9,288,500.

(60) Provisional application No. 61/485,381, filed on May 12, 2011.

(51) Int. Cl.
| | |
|---|---|
| *H04N 19/176* | (2014.01) |
| *H04N 19/186* | (2014.01) |
| *H04N 19/44* | (2014.01) |
| *H04N 19/80* | (2014.01) |
| *H04N 19/86* | (2014.01) |
| *H04N 19/593* | (2014.01) |
| *H04N 19/11* | (2014.01) |
| *H04N 19/436* | (2014.01) |

(52) U.S. Cl.
CPC ......... *H04N 19/117* (2014.11); *H04N 19/176* (2014.11); *H04N 19/186* (2014.11); *H04N 19/436* (2014.11); *H04N 19/44* (2014.11); *H04N 19/80* (2014.11); *H04N 19/86* (2014.11)

(56) References Cited

U.S. PATENT DOCUMENTS

| | | |
|---|---|---|
| 2012/0287995 A1 | 11/2012 | Budagavi |
| 2014/0072033 A1 | 3/2014 | Chuang |

OTHER PUBLICATIONS

Jungsun Kim et al., "New Intra Chroma Prediction using Inter-channel Correlation", JCTVC-B021, Jul. 21-28, 2010, Joint Collaborative Team on Video Coding (JCT-VC) of ITU-T SG16 WP3 and ISO/IEC JTC1/SC29/WG11, Geneva, Switzerland, 9 pages.

Jianle Chen and Vadim Seregin, "Chroma Intra Prediction by Reconstructed Luma Samples", JCTVC-C206, Oct. 7-15, 2010, Joint Collaborative Team on Video Coding (JCT-VC) of ITU-T SG16 WP3 and ISO/IEC JTC1/SC29/WG11, Guangzhou, China, 7 pages.

Jianle Chen et al., "CE6.a: Chroma Intra Prediction by Reconstructed Luma Samples", JCTVC-D350, Jan. 20-28, 2011, Joint Collaborative Team on Video Coding (JCT-VC) of ITU-T SG16 WP3 and ISO/IEC JTC1/SC29/WG11, Daegu, South Korea, 7 pages.

Jianle Chen et al., "CE6.a.4: Chroma Intra Prediction by Reconstructed Luma Samples", JCTVC-E266, Mar. 16-23, 2011, Joint Collaborative Team on Video Coding (JCT-VC) of ITU-T SG16 WP3 and ISO/IEC JTC1/SC29/WG11, Geneva, Switzerland, 10 pages.

Madhukar Budagavi and Akira Osamoto, "Luma-based Chroma Intra Prediction Simplification", JCTVC-F233, Jul. 14-22, 2011, Joint Collaborative Team on Video Coding (JCT-VC) of ITU-T SG16 WP3 and ISO/IEC JTC1/SC29/WG11, Torino, Italy, 5 pages.

* cited by examiner

LUMA-BASED CHROMA INTRA-PREDICTION FOR VIDEO CODING

CROSS-REFERENCE TO RELATED APPLICATIONS

This application is a continuation of U.S. patent application Ser. No. 16/434,773 filed Jun. 7, 2019, which is a continuation of U.S. patent application Ser. No. 15/664,783 filed Jul. 31, 2017, now U.S. Pat. No. 10,368,094, which is a continuation of U.S. patent application Ser. No. 15/069,653 filed Mar. 14, 2016, now U.S. Pat. No. 9,723,327, which is a continuation of U.S. patent application Ser. No. 13/470,186 filed May 11, 2012, now U.S. Pat. No. 9,288,500, which claims the benefit of U.S. Provisional Patent Application Ser. No. 61/485,381, filed May 12, 2011, all of which are incorporated herein by reference in their entirety.

BACKGROUND OF THE INVENTION

Field of the Invention

Embodiments of the present invention generally relate to luma-based chroma intra-prediction in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes than H.264/AVC. In HEVC, the largest coding unit (LCU) can be up to 64×64 in size, while in H.264/AVC, the macroblock size is fixed at 16×16.

Several coding efficiency enhancement tools are proposed in HEVC to reduce coding overhead. One such coding tool is luma-based chroma intra-prediction. In general, in luma-based chroma intra-prediction, chroma values in a block are predicted from down sampled reconstructed luma samples in the same block. More detailed descriptions of this coding tool for HEVC may be found, for example, in J. Kim, et al., "New Intra Chroma Prediction Using Inter-Channel Correlation," JCTVC-B021, Joint Collaborative Team on Video Coding (JCT-VC) of ITU-T SG16 WP3 and ISO/IEC JTC1/SC29/WG11, Geneva, CH, Jul. 21-28, 2010, J. Chen and V. Seregin, "Chroma Intra Prediction by Reconstructed Luma Samples," JCTVC-C206, Joint Collaborative Team on Video Coding (JCT-VC) of ITU-T SG16 WP3 and ISO/IEC JTC1/SC29/WG11, Guangzhou, CN, Oct. 7-15, 2010, J. Chen, et al., "CE6.a: Chroma Intra Prediction by Reconstructed Luma Samples," JCTVC-D350, Joint Collaborative Team on Video Coding (JCT-VC) of ITU-T SG16 WP3 and ISO/IEC JTC1/SC29/WG11, Daegu, KR, Jan. 20-28, 2011, and J. Chen, et al., "CE6.a.4: Chroma Intra Prediction by Reconstructed Luma Samples," JCTVC-E266, Joint Collaborative Team on Video Coding (JCT-VC) of ITU-T SG16 WP3 and ISO/IEC JTC1/SC29/WG11, Geneva, CH, Mar. 16-23, 2011.

SUMMARY

Embodiments of the present invention relate to methods and apparatus for luma-based chroma intra-prediction in video coding. In one aspect, a method for luma-based chroma intra-prediction in a video encoder or a video decoder is provided that includes filtering reconstructed neighboring samples of a reconstructed down sampled luma block, computing parameters $\alpha$ and $\beta$ of a linear model using the filtered, reconstructed neighboring samples of the reconstructed down sampled luma block and reconstructed neighboring samples of a corresponding chroma block, wherein the linear model is $Pred_C[x,y]=\alpha \cdot Rec_L[x,y]+\beta$, wherein x and y are sample coordinates, $Pred_C$ is predicted chroma samples, and $Rec_L'$ is samples of the reconstructed down sampled luma block, and computing samples of a predicted chroma block from corresponding samples of the reconstructed down sampled luma block using the linear model and the parameters.

In one aspect, a method for luma-based chroma intra-prediction in a video encoder or a video decoder is provided that includes computing parameters $\alpha$ and $\beta$ of a linear model using reconstructed neighboring samples of a reconstructed down sampled luma block and of a corresponding chroma block, wherein the linear model is $Pred_C[x,y]= \alpha \cdot Rec_L[x,y]+$, wherein x and y are sample coordinates, $Pred_C$ is predicted chroma samples, and $Rec_L'$ is samples of the reconstructed down sampled luma block; normalizing the parameter $\alpha$, and computing samples of a predicted chroma block from corresponding samples of the reconstructed down sampled luma block using the linear model and the parameters.

In one aspect, a method for luma-based chroma intra-prediction in a video encoder or a video decoder is provided that includes determining a type of luma-based chroma intra-prediction to be used, wherein the type is one of a plurality of types of luma-based chroma intra-prediction, and performing luma-based chroma intra-prediction according to the determined type to generate a predicted chroma block.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
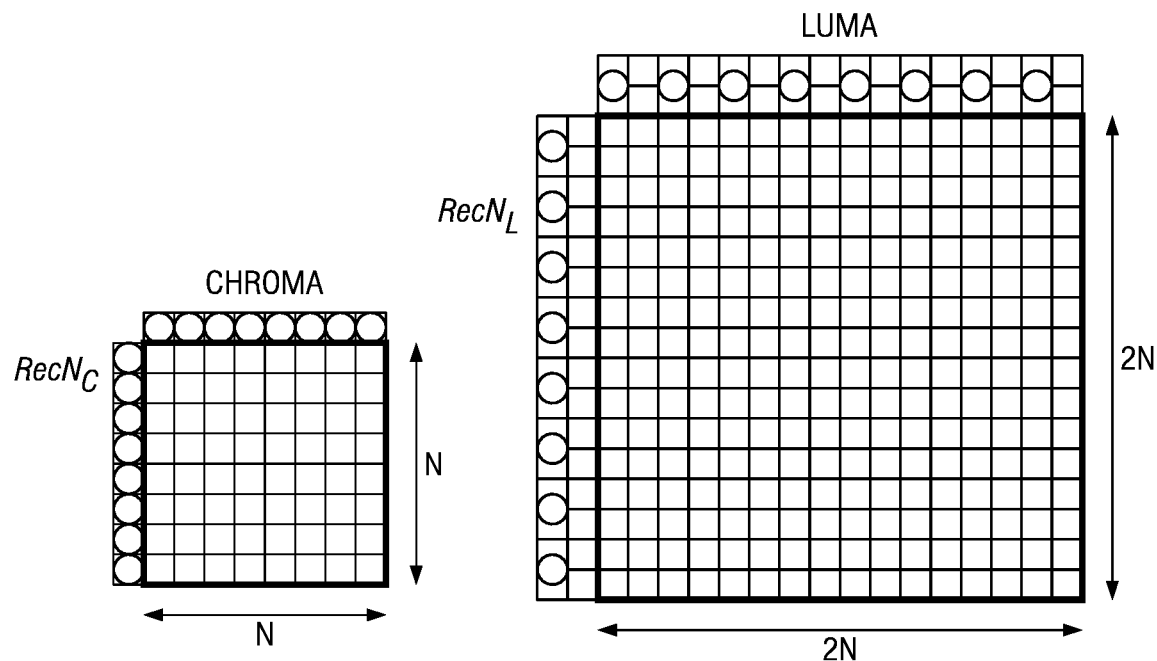
FIG. 1 illustrates prior art parameter derivation for luma-based chroma intra-prediction.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

Some aspects of this disclosure have been presented to the JCT-VC in M. Budagavi and A. Osamoto, "Luma-Based Chroma Intra Prediction Simplification", JCTVC-F233, Joint Collaborative Team on Video Coding (JCT-VC) of ITU-T SG16 WP3 and ISO/IEC JTC1/SC29/WG11, Torino, IT, Jul. 14-22, 2011, which is incorporated by reference herein in its entirety.

As previously discussed, luma-based chroma intra-prediction is a new coding tool proposed in HEVC. In general, in luma-based chroma intra-prediction, chroma values for a block of video data are predicted from down sampled luma samples of the same block as follows:

$$\text{Pred}_C[x,y] = \alpha \cdot \text{Rec}_L'[x,y] + \beta \quad (1)$$

where $\text{Pred}_C$ is the predicted chroma samples and $\text{Rec}_L'$ is the down sampled reconstructed luma samples. In essence, the predicted chroma samples are modeled as a linear function of luma samples of the current luma block. The reconstructed luma samples are down sampled to match the size and phase of the reconstructed chroma samples. Down sampling, also referred to as sub sampling, is the process of reducing the sampling rate of signal and is usually done to reduce the size of the data. If $\text{Rec}_L$ is the reconstructed luma samples in a block, $\text{Rec}_L'$ is calculated as follows:

$$\text{Rec}_L'[x,y] = (\text{Rec}_L[2x,2y] + \text{Rec}_L[2x,2y+1]) \gg 1. \quad (2)$$

Parameters $\alpha$ and $\beta$ are derived from reconstructed samples neighboring the current chroma and luma blocks. FIG. 1 shows an example of the locations of these neighboring samples for an N×N chroma block and a 2N×2N luma block. In this figure, the shaded dots illustrate the positions of the reconstructed neighboring chroma and luma samples, $\text{RecN}_C$ and $\text{RecN}_L$, around the respective chroma and luma block.

The ordinary least square (OLS) technique, also referred to as the linear least squares technique, is used to derive the parameters $\alpha$ and $\beta$:

$$\alpha = \frac{I \sum_{i=0}^{I-1} \text{RecN}_C(i) \text{RecN}_L(i) - \sum_{i=0}^{I-1} \text{RecN}_C(i) \sum_{i=0}^{I-1} \text{RecN}_L(i)}{I \sum_{i=0}^{I-1} \text{RecN}_L(i) \text{RecN}_L(i) - \left(\sum_{i=0}^{I-1} \text{RecN}_L(i)\right)^2} = \frac{A_1}{A_2} \quad (3)$$

$$\beta = \frac{\sum_{i=0}^{I-1} \text{RecN}_C(i) - \alpha \sum_{i=0}^{I-1} \text{RecN}_L(i)}{I} \quad (4)$$

where $\text{RecN}_C(i)$ and $\text{RecN}_L(i)$ are, respectively, the neighboring reconstructed chroma samples and the neighboring down sampled reconstructed luma samples and I is the total number of samples of the neighboring data. For a target N×N chroma block, when both left and top causal samples are available, the total number of involved samples is 2N. When only the left or top causal samples are available, the total number of involved samples is N.

Embodiments of the invention provide for simplification of the above described luma-based chroma intra-prediction and/or modifications to facilitate parallel processing. In some embodiments, computational complexity is reduced by sub-sampling $\text{RecN}_C(i)$ and $\text{RecN}_L(i)$ before performing the ordinary least squares (OLS) computation. In some embodiments, to facilitate parallel processing, the computation of the parameters $\alpha$ and $\beta$ is modified to use predicted left chroma and luma samples instead of the reconstructed left chroma and luma samples. In some embodiments, to facilitate parallel processing, the reconstructed left chroma and luma samples are not used, even if available. In some embodiments, the precision for computing the parameter $\alpha$ is reduced by a norm operation without loss of compression efficiency.

Figure 2:
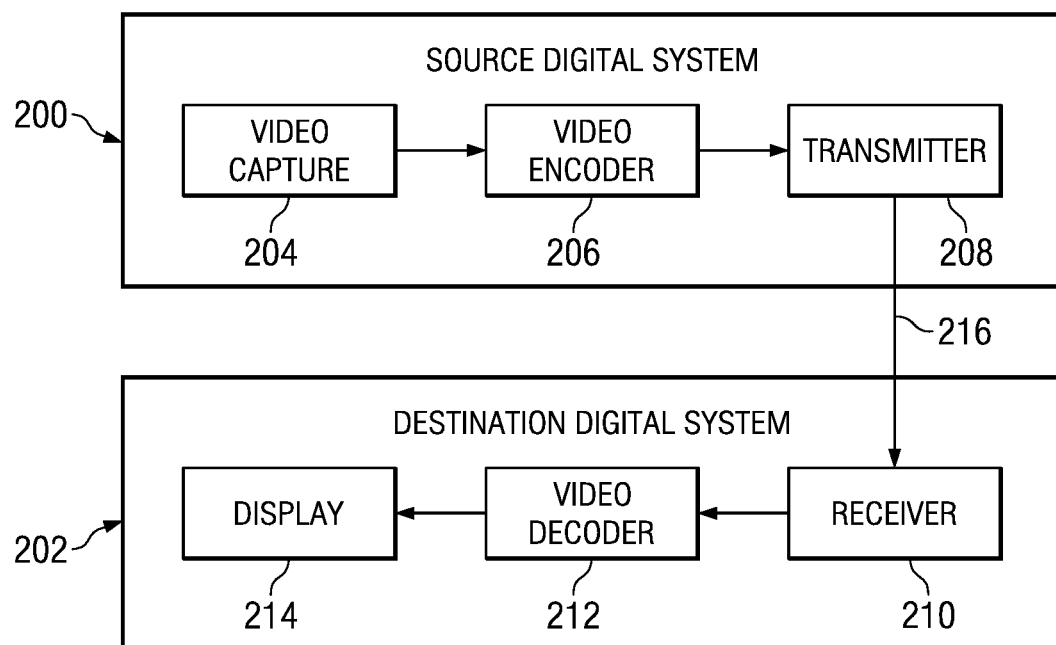
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to apply luma-based chroma intra-prediction techniques during the encoding process as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to apply luma-based chroma intra-prediction techniques during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
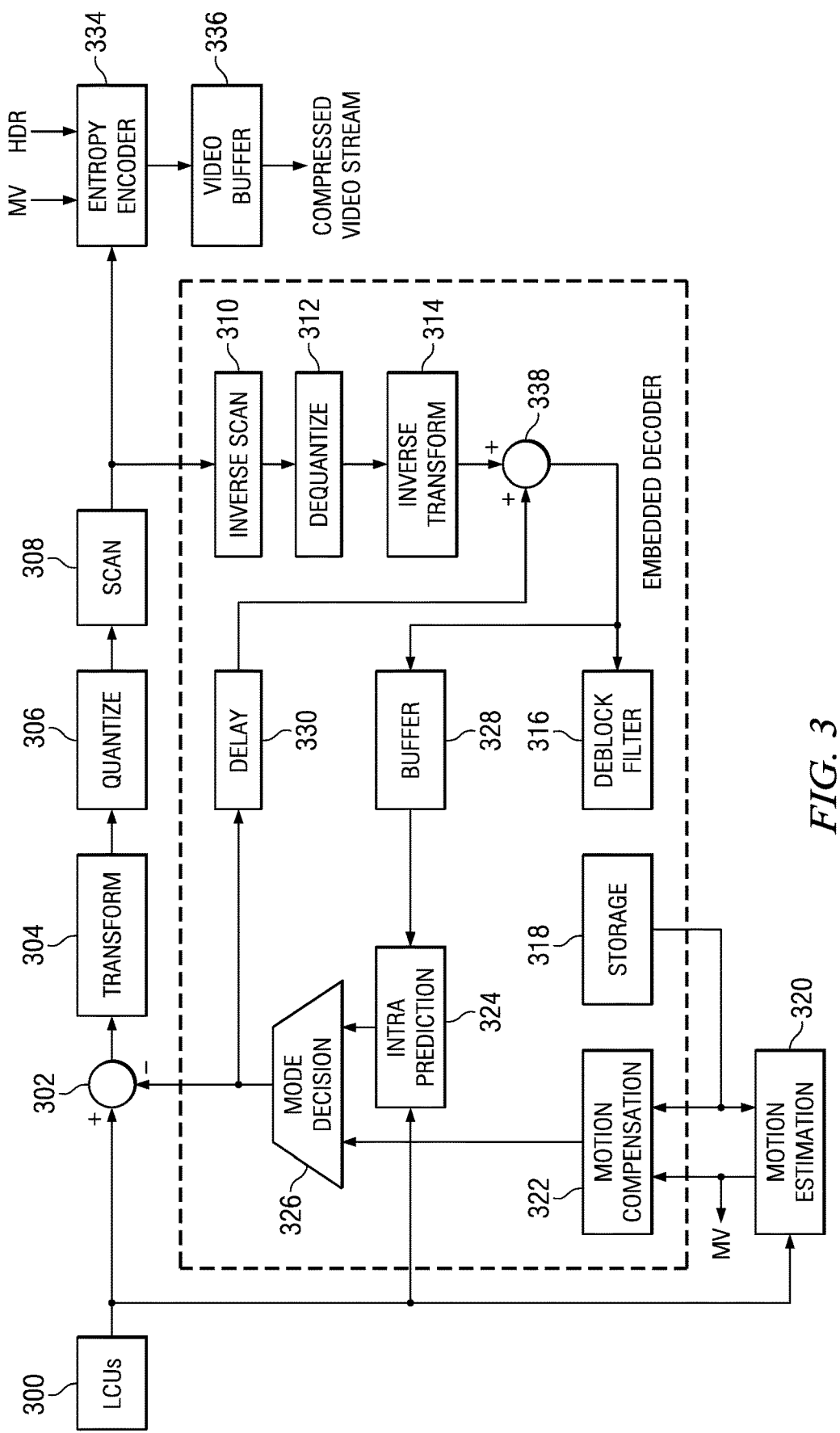
FIG. 3 is a block diagram of a video encoder.

FIG. 3 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

In addition, for pipelined architectures in which multiple PUs and CUs may be processed concurrently in different components of the LCU processing, the coding control component controls the processing of PUs and CUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into PUs according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted PU of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted PUs are also provided to the mode decision component 326.

The intra-prediction component 324 provides intra-prediction information to the mode decision component 326 that includes intra-predicted PUs and the corresponding intra-prediction modes. That is, the intra-prediction component 324 performs intra-prediction in which tests based on multiple intra-prediction modes and transform unit sizes are performed on CUs in an LCU using previously encoded neighboring PUs from the buffer 328 to choose the best intra-prediction mode for each PU in the CU based on a coding cost. As is well known, a block of video data may include both luma data and chroma data, which may be encoded separately. For simplicity of explanation, a 4:2:0 sampling rate is assumed in which for each 2×2 luma sample, there are two corresponding chroma samples. Other sampling rates, e.g., 4:2:2 and 4:4:4, may also be used in embodiments. Further, different intra-prediction modes may be used for luma and chroma in a PU. One of the intra-prediction modes considered by the intra-prediction component 324 for chroma is a luma-based chroma intra-prediction mode, also referred to as a linear method mode (LM mode). The luma-based chroma intra-prediction may be performed according to methods described herein.

To perform the tests, the intra-prediction component 324 may begin with the CU structure provided by the coding control. The intra-prediction component 324 may divide each CU indicated in the CU structure into PUs according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted PUs and the associated transform block sizes are also provided to the mode decision component 326.

The mode decision component 326 selects between the motion-compensated inter-predicted PUs from the motion compensation component 322 and the intra-predicted PUs from the intra-prediction component 324 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted PU from the current PU to provide a residual PU to the transform component 304. The resulting residual PU is a set of pixel difference values that quantify differences between pixel values of the original PU and the predicted PU. The residual blocks of all the PUs of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantized transform coefficients are taken out of their scan ordering by a scan component 308 and arranged by significance, such as, for example, beginning with the more significant coefficients followed by the less significant.

The ordered quantized transform coefficients for a CU provided via the scan component 308 along with header information for the CU are coded by the entropy encoder 334, which provides a compressed bit stream to a video buffer 336 for transmission or storage. The header information may include the prediction mode used for the CU. The entropy encoder 334 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

Figure 4:
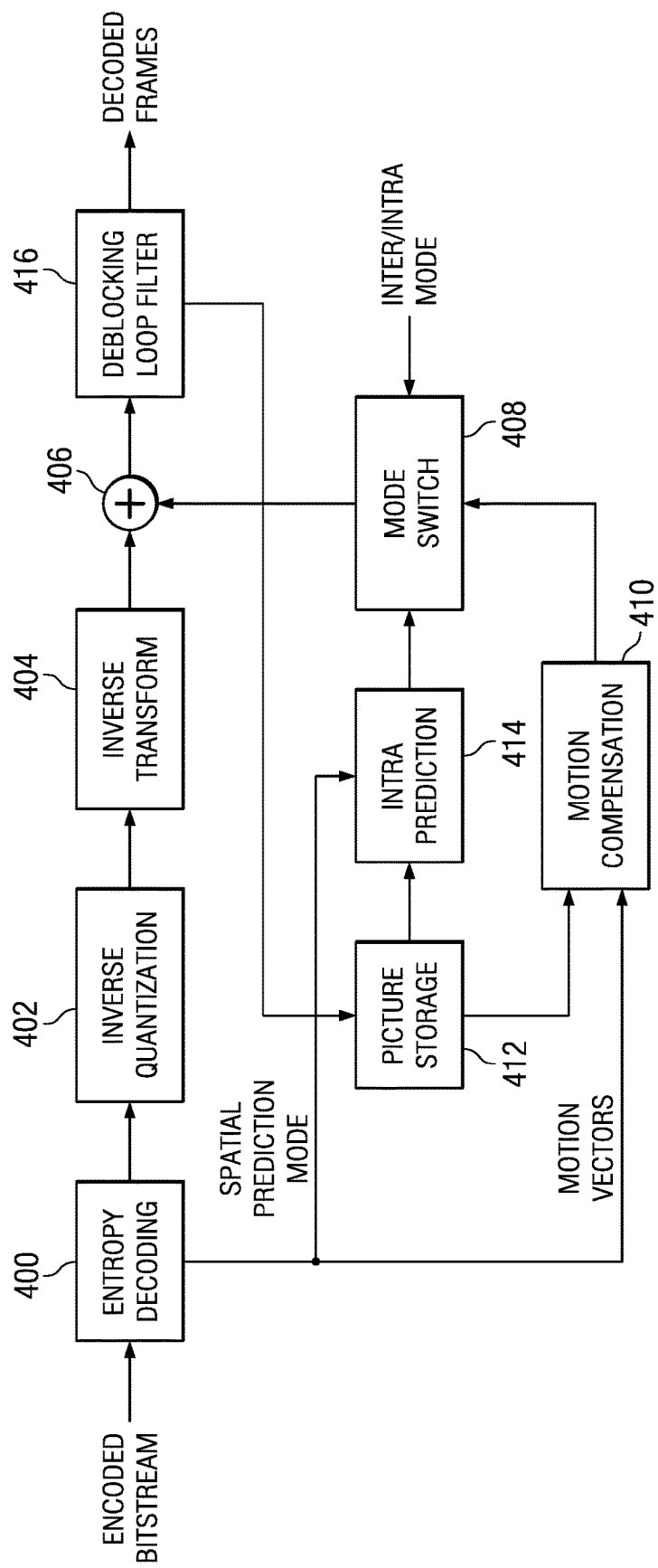
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 400 then reconstructs the motion vector(s) as needed and provides the motion vector(s) to the motion compensation component 410.

The inverse quantization component 402 de-quantizes the quantized transform coefficients of the residual CU. The inverse transform component 404 transforms the frequency domain data from the inverse quantization component 402 back to the residual CU. That is, the inverse transform component 404 applies an inverse unit transform, i.e., the inverse of the unit transform used for encoding, to the de-quantized residual coefficients to produce the residual CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from storage 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reference data from previously decoded PUs of a current picture from the picture storage 412 and applies the intra-prediction computed by the encoder as signaled by the intra-prediction mode transmitted in the encoded video bit stream to the reference data to generate a predicted PU. If LM mode is signaled, the intra-prediction component 414 may perform the luma-based chroma intra-prediction according to methods described herein.

The addition component 406 generates a decoded CU by adding the predicted PUs selected by the mode switch 408 and the residual CU. The output of the addition component 406 supplies the input of the in-loop filter component 416. The in-loop filter component 416 performs the same filtering as the encoder. The output of the in-loop filter component 416 is the decoded pictures of the video bit stream. Further, the output of the in-loop filter component 416 is stored in storage 412 to be used as reference data.

Methods for simplification of luma-based chroma intra-prediction are now described. Unless otherwise stated, these methods may be used in both an encoder and a decoder.

Figure 5:
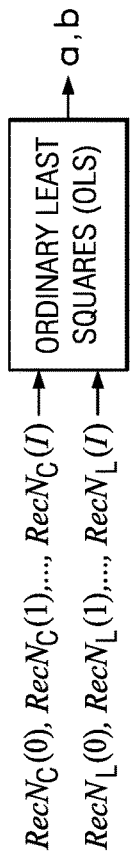
FIGS. 5-11 are flow diagrams of methods.
Figure 6:
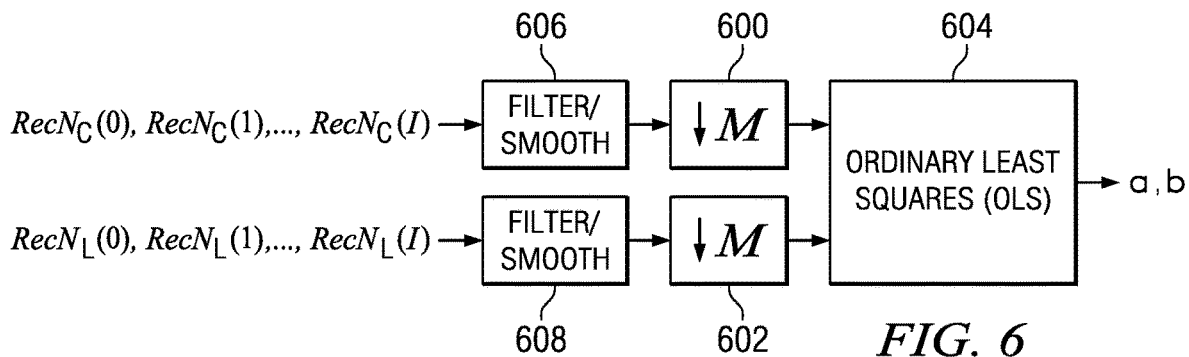

As shown in FIG. 5, in the prior art, I reconstructed neighboring samples of the chroma block and I reconstructed and down sampled neighboring samples of the reconstructed luma block are used to derive the parameters α and β used to compute the predicted chroma samples. These parameters are derived using the OLS technique. As shown in FIG. 6, the number of operations required to compute α and β may be reduced by down sampling 600, 602 the reconstructed neighboring luma and chroma samples prior to performing the ordinary least squares computation 604. For example, for an 8×8 block, the reconstructed samples may be down sampled by 2, thus reducing the number of multiplications needed for the computation of α and β from 32 to 16. In another example, for a 16×16 block, the reconstructed samples may be down sampled by 4, thus reducing the number of multiplications needed for the computation of α and β from 64 to 16. In some embodiments, for improved quality, a smoothing filter 606, 608 is applied to the reconstructed neighboring samples prior to the down sampling 600, 602. Any suitable filter may be used, e.g., [0.5, 0.5], [0.25, 0.5, 0.25], etc. Experiments have shown that the down sampling of the reconstructed samples may result in no loss in coding quality.

Figure 7:
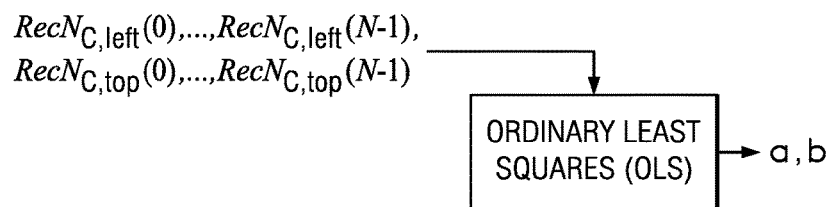

As shown in FIG. 7, in the prior art, N reconstructed left neighboring samples and N reconstructed top neighboring samples of the chroma block and N down sampled reconstructed left neighboring samples and N down sampled reconstructed top neighboring samples of the luma block are used to derive the parameters α and β used to compute the predicted chroma samples. These parameters are derived using the OLS technique. In real-time pipelined systems in which motion estimation, intra prediction estimation, transform/quantization, entropy coding, etc. may be executed on different processing units, the left reconstructed neighboring luma and chroma samples may not be available in the encoder at the time the mode decision is made.

Figure 8:
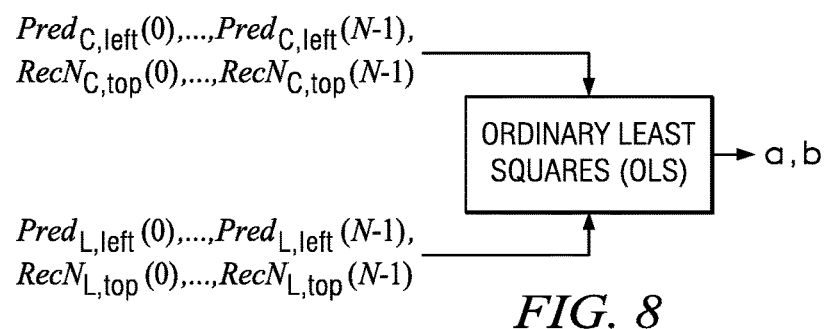

To facilitate use of the LM intra-prediction mode on such systems, the calculation of the parameters α and β is modified as shown in FIG. 8. Rather than using the reconstructed left neighboring chroma and luma samples, predicted left neighboring chroma samples, i.e., $Pred_{C,left}(0), \ldots, Pred_{C,left}(N-1)$, and predicted left neighboring luma samples, i.e., $Pred_{L,left}'(0), \ldots, Pred_{L,left}'(N-1)$, are used to derive the parameters. In some embodiments, the parameters α and β may be computed using only the reconstructed top neighboring chroma and luma samples.

Figure 9:
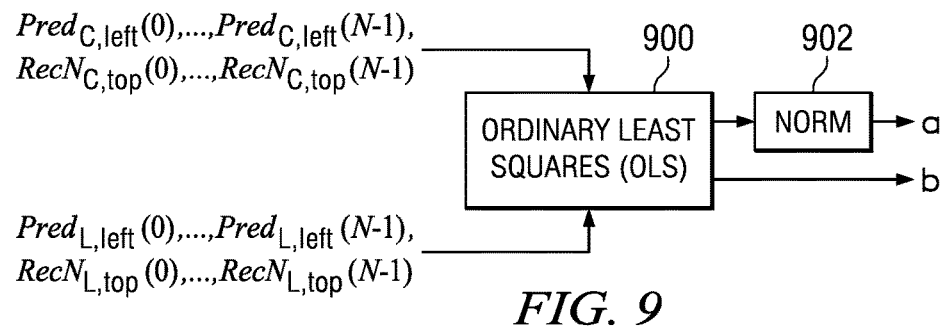

In the prior art, the value of the parameter α is computed at 16-bit precision. Thus, the multiplication by α in Eq. 1, which is performed for each chroma sample, requires a 16-bit multiplier. As is illustrated in FIG. 9, the value of α may be normalized 902 after the OLS computation 900 to reduce the precision of α. The normalization 902 may be performed, for example, by counting the leading number of zeroes (for positive numbers) or ones (for negative numbers) and shifting by the count to normalize the value. In one embodiment, the value of α is normalized as per the following equation:

$$a = a3 >> \text{Max}(0, \text{Log } 2(\text{abs}(a3)) - 6)$$

where a3 is the original value of α and a is the value of α after normalization. The above equation may be implemented as per the following pseudo code:

Short n=CountLeadingZerosOnes(a);
a=α>>(9−n);

Note that the above equation and pseudo code reduce the precision of α to 7 bits. Other normalization of α may also be used to reduce the precision of α to, for example, 6 bits or 8 bits. Experiments have shown that normalization of α to reduce the precision of α to 6, 7, or 8 bits may result in no loss of compression efficiency. Further, while FIG. 9 shows the input to the OLS 900 being predicted left neighboring chroma and luma samples and reconstructed top neighboring chroma and luma samples, the normalization of α may also be used when the input to the OLS is reconstructed top neighboring chroma and luma samples only, or when the input is reconstructed top and left neighboring chroma and luma samples.

Figure 10:
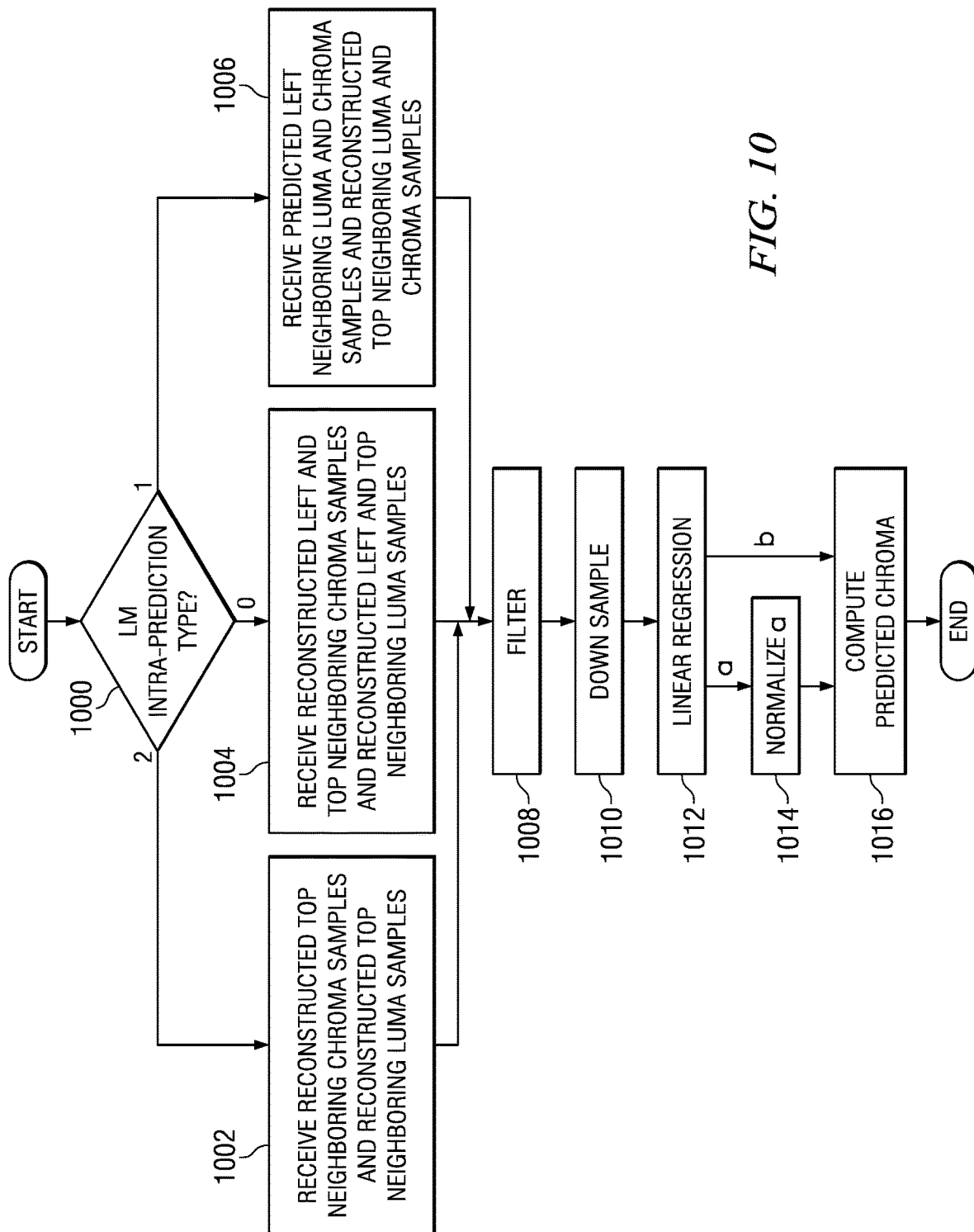

FIG. 10 shows a method for LM intra-prediction in which three types of LM intra-prediction are supported: using both the reconstructed top and left neighboring luma and chroma samples to calculate the parameters α and β, using reconstructed top neighboring luma and chroma samples and predicted left neighboring luma and chroma samples to calculate the parameters α and β, and using only the reconstructed top neighboring luma and chroma samples to calculate the parameters α and β (even if the reconstructed left neighboring luma and chroma samples are available). The selection of which type of LM intra-prediction type to use is made on the encoder side and may be signaled to the decoder in a sequence parameter set, a picture parameter set, and/or at the slice level. For simplicity of explanation, 0, 1, and 2 are used to designate specific types of LM intra-prediction in the method. Any suitable unique designation of each type may be used.

As shown in FIG. 10, initially the LM mode intra-prediction type is determined 1000. In the encoder, the type may be determined in any suitable way by coding control. In the decoder, the type used by the encoder is decoded from the encoded bit stream. If the type is 0 1004, reconstructed left and top neighboring chroma samples and reconstructed left and top neighboring luma samples are received. The reconstructed neighboring luma samples may be down sampled to reduce the sampling rate to that of the chroma samples. If the type is 1 1006, predicted left neighboring luma and chroma samples and reconstructed top neighboring luma and chroma samples are received. The neighboring luma samples may be down sampled to reduce the sampling rate to that of the chroma samples. If the type is 2 1002, reconstructed top neighboring chroma and luma samples are received. The reconstructed top neighboring luma samples may be down sampled to reduce the sampling rate to that of the chroma samples.

In the decoder of FIG. 4, the reconstructed samples may be received from, for example, picture storage 412 or line buffers storing the samples. The predicted left neighboring samples may be stored after processing of the left neighboring luma and chroma blocks by the intra-prediction component 414 and received from that storage. In the encoder of FIG. 3, the reconstructed samples may be received from, for example, storage 318 or line buffers storing the samples. The predicted left neighboring samples may be stored after processing of the left neighboring luma and chroma blocks by the intra-prediction component 324 and received from that storage.

Referring back to FIG. 10, the received neighboring samples are then filtered 1008. Any suitable filters may be used and the filters for top neighboring samples and left neighboring samples may be different, e.g., [0.5, 0.5], [0.25, 0.5, 0.25] etc. Different filters may also be used for chroma and luma samples.

The filtered neighboring samples are then down sampled to reduce the number of operations needed to compute the parameters α and β. Such down sampling is previously discussed herein. The parameters α and β are then computed 1012 by linear regression using the down sampled filtered neighboring samples. Any suitable technique for linear regression may be used. In some embodiments, the ordinary least squares technique as previously described is used.

The parameter α is then normalized 1014, and the two parameters are used to compute 1016 the predicted chroma block from the corresponding down sampled reconstructed luma block as per Eq. 1. Normalization of the parameter α is previously discussed herein.

Figure 11:
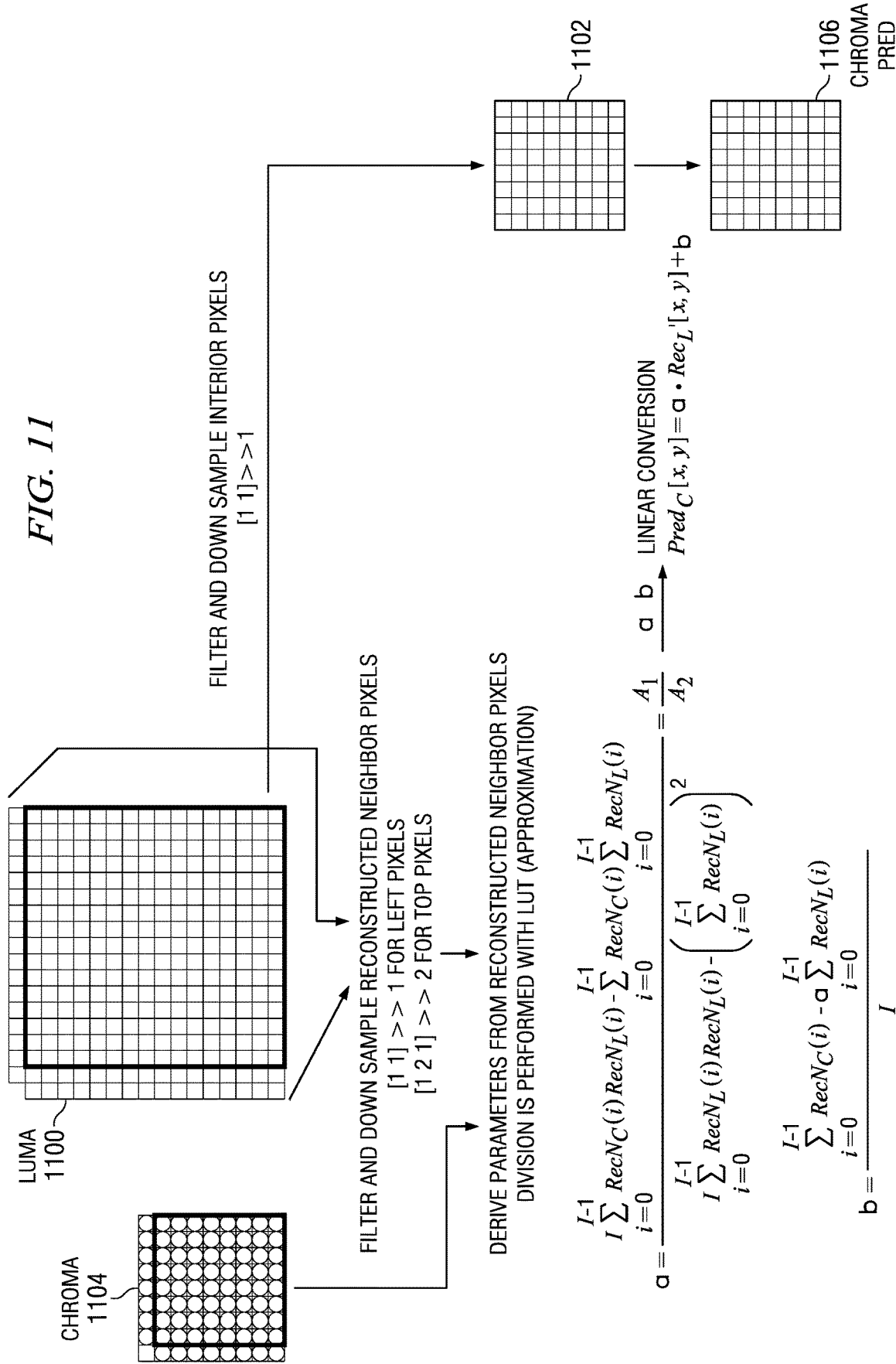

FIG. 11 shows a method for LM intra-prediction. The interior pixels of the reconstructed luma block 1100 are filtered and down sampled to generate a filtered, down sampled luma block 1102 for generating the predicted chroma block. The reconstructed top neighboring pixels and the reconstructed left neighboring pixels of the reconstructed luma block 1100 are also filtered and down sampled for use in deriving the parameters α and β. The parameters are then derived using the reconstructed top and left neighboring pixels of the corresponding chroma block 1104 and the filtered, down sampled reconstructed top and left neighboring pixels of the luma block 1100 as per Eq. 3 and 4. The division operations may be approximated using a look-up table (LUT).

Although not specifically shown, the parameter α may be normalized to reduce the precision of the parameter. Normalization of α is previously described herein. The parameters α and β are then used to compute the predicted chroma values 1106 from the filtered, down sampled luma block 1102 as per Eq. 1.

Figure 12:
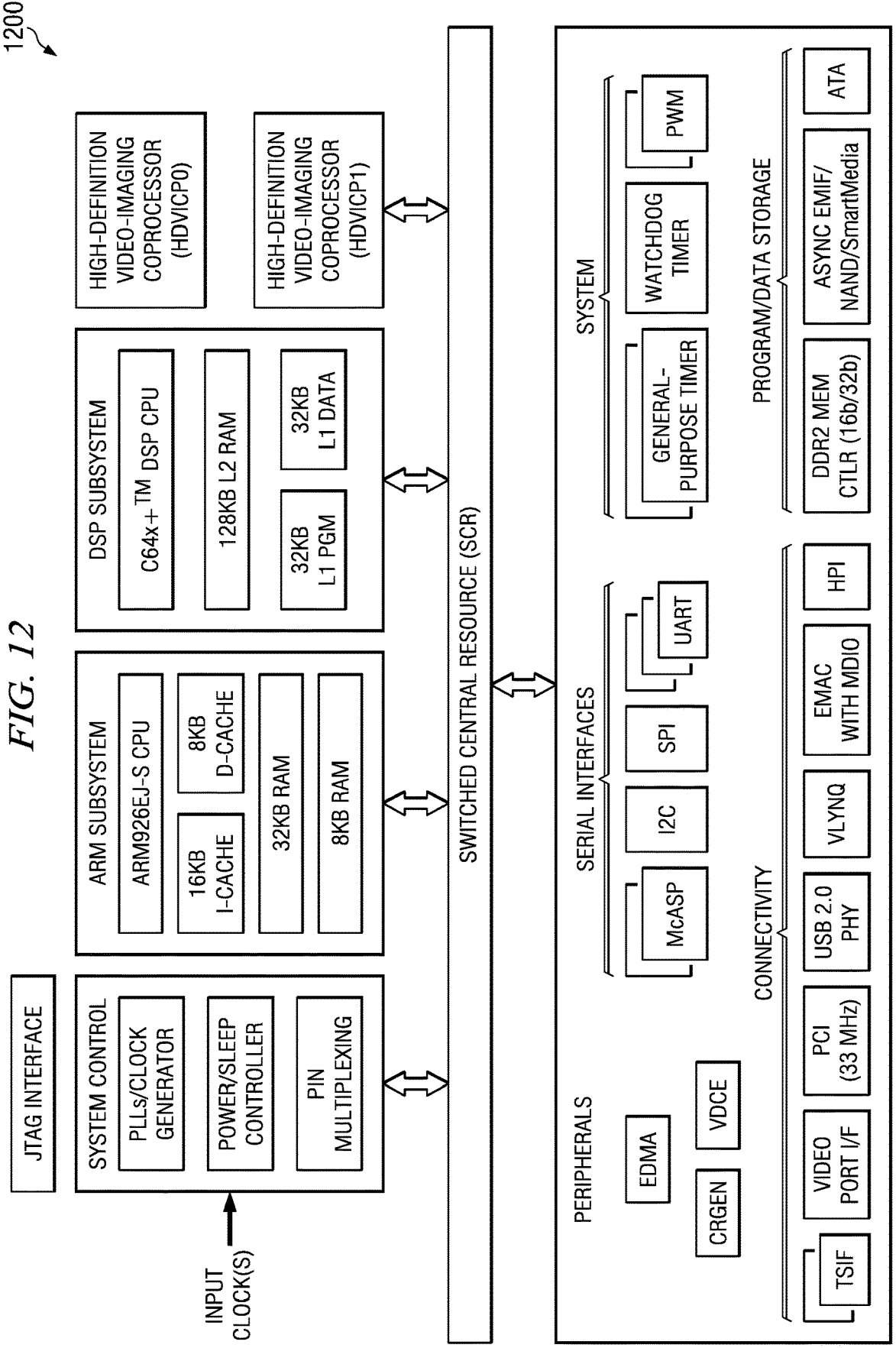
FIG. 12 is a block diagram of an illustrative digital system.

FIG. 12 is a block diagram of an example digital system suitable for use as an embedded system that may be configured to perform luma based chroma intra-prediction as described herein during encoding of a video stream and for decoding of such an encoded video stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1200 is a programmable platform designed to meet the processing needs of applications such as video encode/decode/transcode/transrate, video surveillance, video conferencing, set-top box, medical imaging, media server, gaming, digital signage, etc. The SoC 1200 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1200 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1200, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1200 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 12, the SoC 1200 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1200 may be configured to perform luma-based chroma intra-prediction as described herein for encoding a bit stream and for decoding a bit stream encoded using luma-based chroma intra-prediction as described herein. For example, the coding control of the video encoder of FIG. 8 may be executed on the DSP subsystem or the ARM subsystem and at least some of the computational operations of the block processing, including intra-prediction, motion estimation, entropy encoding, and entropy decoding may be executed on the HDVICP coprocessors. Intra-prediction on the HDVICP coprocessors may implement techniques for luma-based chroma intra-prediction as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, previously described embodiments assumed a 4:2:0 sampling rate. Other sampling rates may also be used, such as 4:2:2 and 4:4:4, as long as the number of neighboring samples I is a power of 2. For a 4:4:4 sampling rate, the initial down sampling of the luma block to the chroma sampling rate is not needed. For a 4:2:2 sampling rate, the initial down sampling of the luma block could be different in the horizontal and vertical directions. For example, for a 16×16 luma block, the chroma block would be 16×8 and the luma block would need to be down sampled differently in the horizontal and vertical directions.

In some embodiments, if neighboring samples are not available, the values of available samples are substituted for the unavailable samples. Any suitable available samples values may be used. Neighboring samples may not be available, for example, at slice boundaries, or when constrained intra-prediction (CIP) is used. When CIP is used, a PU in an inter-predicted picture cannot be intra-predicted using information from neighboring inter-predicted PUs in the picture.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

The invention claimed is:

1. A method comprising:
filtering samples of a down-sampled luma block of a video frame;
computing parameters $\alpha$ and $\beta$ of a linear model using the filtered samples of the down-sampled luma block; and
computing predicted chroma block samples from the samples of the down-sampled luma block using the linear model and the parameters.

2. The method of claim 1, further comprising:
filtering the samples of a chroma block prior to computing parameters $\alpha$ and $\beta$, and
wherein computing parameters $\alpha$ and $\beta$ comprises computing the parameters using the filtered samples of the reconstructed down sampled luma block and the filtered samples of the corresponding chroma block.

3. The method of claim 2, further comprising:
normalizing the parameter $\alpha$ prior to computing samples of the predicted chroma block.

4. The method of claim 3, wherein normalizing the parameter $\alpha$ comprises reducing precision of $\alpha$ to one selected from a group consisting of 6 bits, 7 bits, and 8 bits.

5. The method of claim 1, further comprising:
down sampling the filtered samples of the reconstructed down-sampled luma block prior to computing parameters $\alpha$ and $\beta$; and
wherein computing parameters $\alpha$ and $\beta$ comprises computing the parameters using the down-sampled filtered neighboring samples of the reconstructed down sampled luma block.

6. The method of claim 2, wherein the samples of the chroma block consist of top neighboring samples and left neighboring samples of the chroma block, and the samples of the reconstructed down sampled luma block consist of top samples and left samples of the down-sampled luma block.

7. The method of claim 1, wherein the samples of the chroma block consist of top samples of the chroma block and the samples of the down-sampled luma block consist of top samples of the down-sampled luma block.

8. The method of claim 1, further comprising:
receiving predicted left samples of the chroma block and of the down-sampled luma block; and
wherein computing parameters $\alpha$ and $\beta$ comprises computing the parameters using the predicted left samples of the chroma block and of the down-sampled luma block, the filtered samples of the down-sampled luma block, and the samples of the chroma block, wherein the samples of the down-sampled luma block consist of top samples of the down-sampled luma block, and the samples of the chroma block consist of top samples of the chroma block.

9. One or more computer-readable non-transitory storage media embodying software that is operable when executed to:
filter samples of a down-sampled luma block of a video frame;
compute parameters $\alpha$ and $\beta$ of a linear model using the filtered samples of the down-sampled luma block; and
compute predicted chroma block samples from the samples of the down-sampled luma block using the linear model and the parameters.

10. The media of claim 9, wherein the software is further operable when executed to:
filter the samples of a chroma block prior to computing parameters $\alpha$ and $\beta$, and
wherein computing parameters $\alpha$ and $\beta$ comprises computing the parameters using the filtered samples of the reconstructed down sampled luma block and the filtered samples of the corresponding chroma block.

11. The media of claim 10, wherein the software is further operable when executed to normalize the parameter $\alpha$ prior to computing samples of the predicted chroma block.

12. The media of claim 11, wherein normalizing the parameter $\alpha$ comprises reducing precision of $\alpha$ to one selected from a group consisting of 6 bits, 7 bits, and 8 bits.

13. The media of claim 9, wherein the software is further operable when executed to:
down sample the filtered samples of the reconstructed down-sampled luma block prior to computing parameters $\alpha$ and $\beta$; and
wherein computing parameters $\alpha$ and $\beta$ comprises computing the parameters using the down-sampled filtered neighboring samples of the reconstructed down sampled luma block.

14. The media of claim 10, wherein the samples of the chroma block consist of top neighboring samples and left neighboring samples of the chroma block, and the samples of the reconstructed down sampled luma block consist of top samples and left samples of the down-sampled luma block.

15. The media of claim 9, wherein the samples of the chroma block consist of top samples of the chroma block and the samples of the down-sampled luma block consist of top samples of the down-sampled luma block.

16. The media of claim 9, wherein the software is further operable when executed to:
receive predicted left samples of the chroma block and of the down-sampled luma block; and
wherein computing parameters $\alpha$ and $\beta$ comprises computing the parameters using the predicted left samples of the chroma block and of the down-sampled luma block, the filtered samples of the down-sampled luma block, and the samples of the chroma block, wherein the samples of the down-sampled luma block consist of top samples of the down-sampled luma block, and the samples of the chroma block consist of top samples of the chroma block.

* * * * *